United States Patent
Lee et al.

(10) Patent No.: US 11,533,661 B2
(45) Date of Patent: Dec. 20, 2022

(54) METHOD FOR PERFORMING CELL RESELECTION AND DEVICE SUPPORTING THE SAME

(71) Applicant: LG ELECTRONICS INC., Seoul (KR)

(72) Inventors: Youngdae Lee, Seoul (KR); Eunjong Lee, Seoul (KR); Hyunjung Choe, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/963,891

(22) PCT Filed: Apr. 5, 2019

(86) PCT No.: PCT/KR2019/004088
§ 371 (c)(1),
(2) Date: Jul. 22, 2020

(87) PCT Pub. No.: WO2019/194648
PCT Pub. Date: Oct. 10, 2019

(65) Prior Publication Data
US 2021/0037433 A1 Feb. 4, 2021

(30) Foreign Application Priority Data
Apr. 5, 2018 (KR) .................. 10-2018-0039994

(51) Int. Cl.
*H04W 36/00* (2009.01)
*H04W 76/27* (2018.01)
(Continued)

(52) U.S. Cl.
CPC ....... *H04W 36/0055* (2013.01); *H04W 24/10* (2013.01); *H04W 36/08* (2013.01);
(Continued)

(58) Field of Classification Search
CPC ....... H04W 36/00837; H04W 36/0085; H04W 48/20; H04W 36/0061; H04W 36/00835;
(Continued)

(56) References Cited

U.S. PATENT DOCUMENTS 9,020,481 B1 4/2015 Monin et al.
2011/0080895 A1 4/2011 Iwamura et al.
(Continued)

FOREIGN PATENT DOCUMENTS

WO 2018/009362 A2 1/2018

OTHER PUBLICATIONS

Interdigital Communications, 'Comparison of UL Data Transmission Solutions for Inactive State', R2-1701190, 3GPP TSG-RAN WG2 #97, Athens, Greece, Feb. 4, 2017 See pp. 1-4.
(Continued)

*Primary Examiner* — Nam T Huynh
(74) *Attorney, Agent, or Firm* — Dentons US LLP

(57) ABSTRACT

Provided are a method of performing cell reselection and a device supporting the method. According to one embodiment of the present disclosure, the method includes: starting data transmission or data reception while the UE is in radio resource control (RRC) idle state or RRC inactive state; applying an offset value to a serving cell for cell reselection; performing cell reselection based on the applied offset value, during the data transmission or data reception; and stopping applying the offset value to the serving cell, when the data transmission or data reception is succeeded.

15 Claims, 10 Drawing Sheets

(51) Int. Cl.
    *H04W 24/10* (2009.01)
    *H04W 36/08* (2009.01)
    *H04W 36/38* (2009.01)
    *H04W 48/06* (2009.01)
    *H04W 48/20* (2009.01)
    *H04W 68/00* (2009.01)
    *H04W 74/08* (2009.01)
    *H04W 80/02* (2009.01)

(52) U.S. Cl.
    CPC .......... *H04W 36/38* (2013.01); *H04W 48/06* (2013.01); *H04W 48/20* (2013.01); *H04W 68/005* (2013.01); *H04W 74/0833* (2013.01); *H04W 76/27* (2018.02); *H04W 80/02* (2013.01)

(58) Field of Classification Search
    CPC ... H04W 36/08; H04W 72/042; H04W 36/04; H04W 36/30
    See application file for complete search history.

(56) References Cited

U.S. PATENT DOCUMENTS

| | | |
|---|---|---|
| 2014/0213277 A1 | 7/2014 | Jang |
| 2015/0071157 A1 | 3/2015 | Jung et al. |
| 2017/0257811 A1* | 9/2017 | Dong .............. H04W 36/00835 |
| 2018/0167865 A1 | 6/2018 | Salkintzis |
| 2021/0068010 A1* | 3/2021 | Xu .................... H04W 36/0061 |

OTHER PUBLICATIONS

Catt, 'Considerations on Cell Reselection in RRC inactive state', R2-1801835, 3GPP TSG-RAN WG2 #101, Athens, Greece, Feb. 14, 2018 See pp. 1-2.

Zte Corporation et al., 'Consideration on cell quality derivation in idle and inactive state', R2-1802043, 3GPP TSG-RAN WG2 #101, Athens, Greece, Feb. 15, 2018 See sections 1-3.

Apple Inc., 'Cell reselection in INACTIVE state', R2-1802416, 3GPP TSG-RAN WG2 #101, Athens, Greece, Feb. 15, 2018 See sections 1-3.

* cited by examiner

METHOD FOR PERFORMING CELL RESELECTION AND DEVICE SUPPORTING THE SAME This application is a 35 USC § 371 National Stage entry of International Application No. PCT/KR2019/004088, filed on Apr. 5, 2019, which claims priority to Korean Patent Application No. 10-2018-0039994, filed on Apr. 5, 2018, all of which are incorporated by reference in their entirety herein.

TECHNICAL FIELD

The present invention relates to a wireless communication system, and more particularly, to a method for performing cell reselection and a device supporting the same.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

In NB-IOT or LTE eMTC, UE performing Early Data Transmission may transmit uplink data or receive downlink data while in RRC_IDLE where UE may perform cell reselection. In NR, UE may transmit uplink data or receive downlink data while in RRC_INACTIVE where UE may perform cell reselection.

SUMMARY

According to a prior art, if UE performs data transmission in RRC_IDLE or RRC_INACTIVE while performing cell reselection, UE may re-transmit data whenever UE changes to another cell according to the cell reselection process. Thus, cell reselection may cause interruption in data transmission by preventing UE from performing data transmission and reception.

According to an embodiment of the present invention, a method performed by a user equipment (UE) in a wireless communication system is provided. The method may comprise: starting data transmission or data reception while the UE is in radio resource control (RRC) idle state or RRC inactive state; applying an offset value to a serving cell for cell reselection; performing cell reselection based on the applied offset value, during the data transmission or data reception; and stopping applying the offset value to the serving cell, when the data transmission or data reception is succeeded.

The method may further comprise: receiving information on the offset value from the network.

The information on the offset value may be received via at least one of system information, RRC message or paging message.

The offset value may be positive value.

The method may further comprise: applying negative value of offset to at least one of neighbor cell, before performing the cell reselection.

The method may further comprise: considering a frequency of the serving cell as highest priority frequency, before performing the cell reselection.

The method may further comprise: transmitting an indication, which indicates that serving cell is changed while data transmission or data reception, to a new serving cell when the UE reselects the new serving cell by the cell reselection.

The indication may be transmitted during ran-based notification area (RNA) update procedure.

The indication may be transmitted via a dedicated random access channel (RACH) preamble.

The indication may be transmitted via a media access control (MAC) control element (CE).

According to another embodiment of the present invention, a user equipment (UE) in a wireless communication system is provided. The UE may comprise: a transceiver for transmitting or receiving a radio signal; and a processor coupled to the transceiver, the processor configured to: start data transmission or data reception while the UE is in radio resource control (RRC) idle state or RRC inactive state; apply an offset value to a serving cell for cell reselection; perform cell reselection based on the applied offset value, during the data transmission or data reception; and stop applying the offset value to the serving cell, when the data transmission or data reception is succeeded.

The processor may be further configured to: control the transceiver to receive information on the offset value from the network.

The information on the offset value may be received via at least one of system information, RRC message or paging message.

The offset value may be positive value.

According to another embodiment of the present invention, a processor for a wireless communication device in a wireless communication system is provided. The processor may be configured to control the wireless communication device to: start data transmission or data reception while the UE is in radio resource control (RRC) idle state or RRC inactive state; apply an offset value to a serving cell for cell reselection; perform cell reselection based on the applied offset value, during the data transmission or data reception; and stop applying the offset value to the serving cell, when the data transmission or data reception is succeeded.

According to embodiments of the present invention, performing cell reselection to neighbor cell while a UE camping on a serving cell is transmitting or receiving data may be avoided, by applying offset on cells or by adjusting priorities. Even when cell reselection to another cell is performed, the UE may continue data transmission/reception for a new cell by promptly notifying the cell change.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
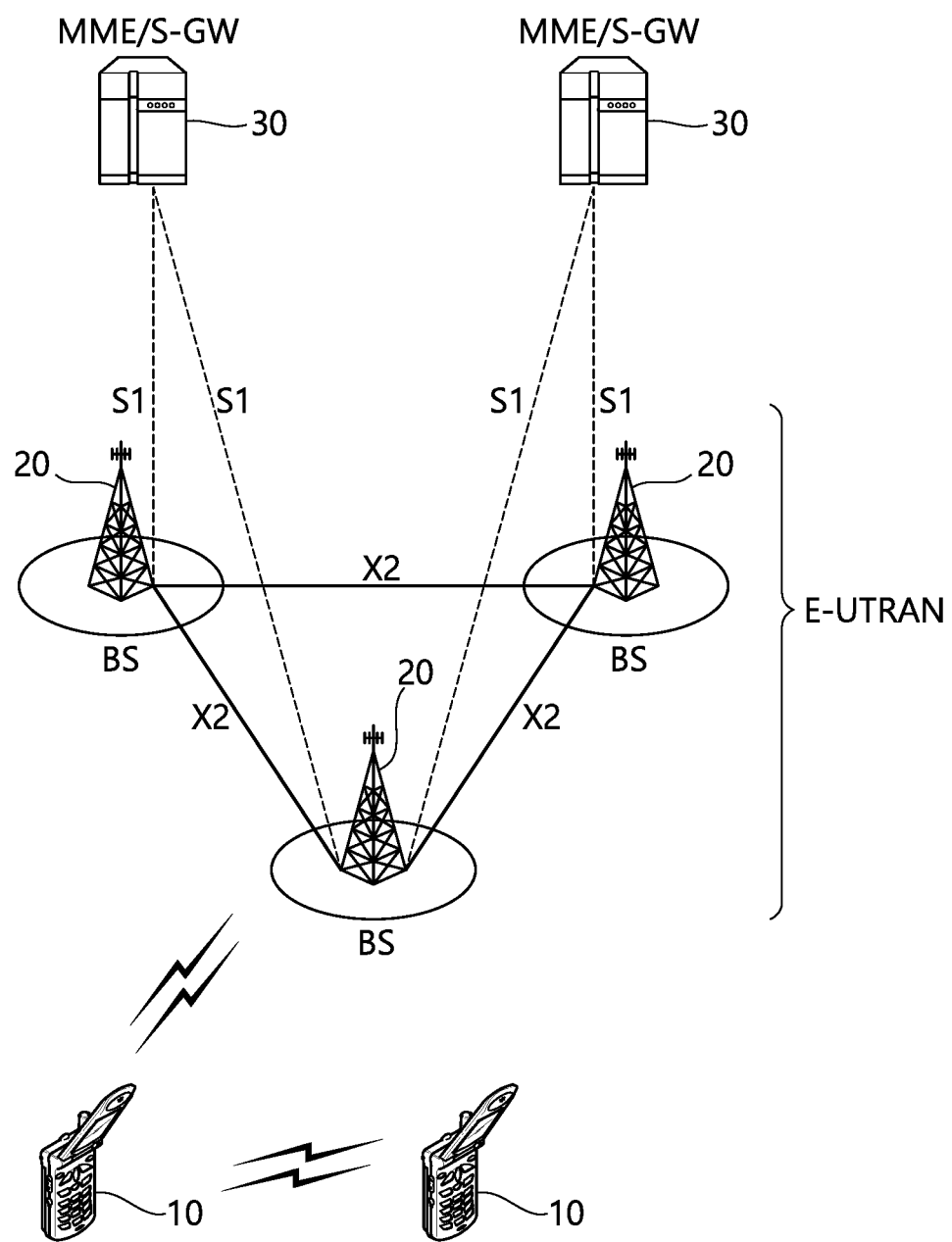
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
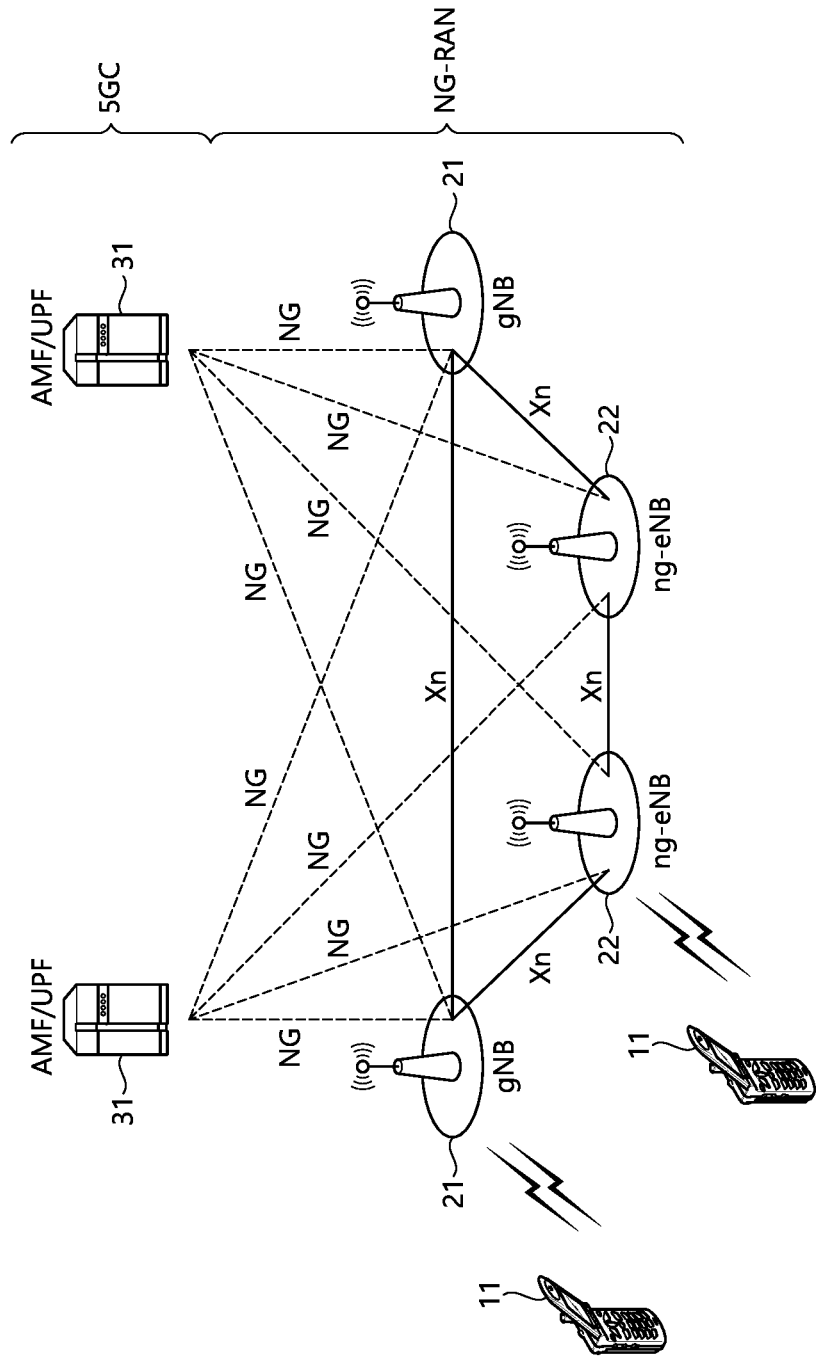
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
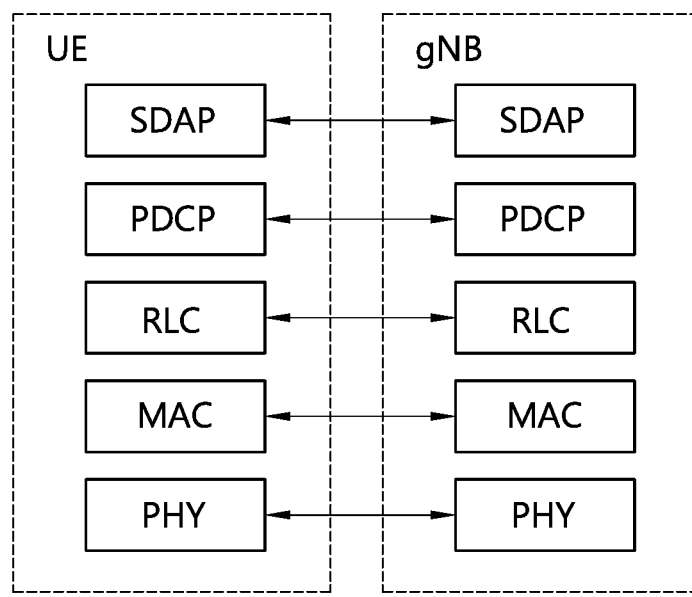
FIG. 3 shows a block diagram of a user plane protocol stack to which technical features of the present invention can be applied.
Figure 4:
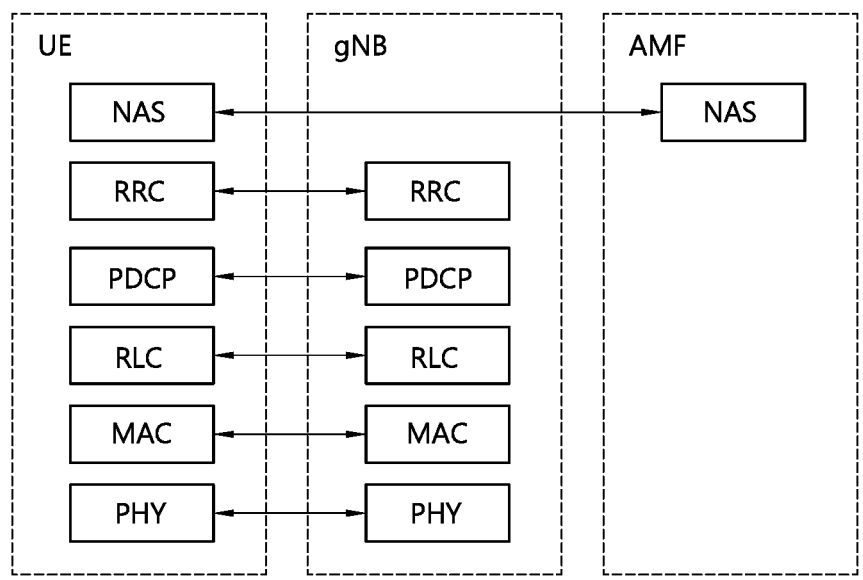
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 0.4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Cell reselection criteria is described.

For NB-IoT inter-frequency cell reselection shall be based on ranking.

If threshServingLowQ is provided in SystemInformationBlockType3 and more than 1 second has elapsed since the UE camped on the current serving cell, cell reselection to a cell on a higher priority E-UTRAN frequency or inter-RAT frequency than the serving frequency shall be performed if:

A cell of a higher priority EUTRAN or UTRAN FDD RAT/frequency fulfils Squal >ThreshX, HighQ during a time interval TreselectionRAT; or A cell of a higher priority UTRAN TDD, GERAN or CDMA2000 RAT/frequency fulfils Srxlev>ThreshX, HighP during a time interval TreselectionRAT.

Otherwise, cell reselection to a cell on a higher priority E-UTRAN frequency or inter-RAT frequency than the serving frequency shall be performed if:

A cell of a higher priority RAT/frequency fulfils Srxlev>ThreshX, HighP during a time interval TreselectionRAT; and More than 1 second has elapsed since the UE camped on the current serving cell.

Cell reselection to a cell on an equal priority E-UTRAN frequency shall be based on ranking for Intra-frequency cell reselection.

If threshServingLowQ is provided in SystemInformationBlockType3 and more than 1 second has elapsed since the UE camped on the current serving cell, cell reselection to a cell on a lower priority E-UTRAN frequency or inter-RAT frequency than the serving frequency shall be performed if:

The serving cell fulfils Squal<ThreshServing, LowQ and a cell of a lower priority EUTRAN or UTRAN FDD RAT/frequency fulfils Squal>ThreshX, LowQ during a time interval TreselectionRAT; or The serving cell fulfils Squal<ThreshServing, LowQ and a cell of a lower priority UTRAN TDD, GERAN or CDMA2000 RAT/frequency fulfils Srxlev>ThreshX, LowP during a time interval TreselectionRAT.

Otherwise, cell reselection to a cell on a lower priority E-UTRAN frequency or inter-RAT frequency than the serving frequency shall be performed if:

The serving cell fulfils Srxlev<ThreshServing, LowP and a cell of a lower priority RAT/frequency fulfils Srxlev>ThreshX, LowP during a time interval TreselectionRAT; and More than 1 second has elapsed since the UE camped on the current serving cell.

Cell reselection to a higher priority RAT/frequency shall take precedence over a lower priority RAT/frequency, if multiple cells of different priorities fulfil the cell reselection criteria.

The UE shall not perform cell reselection to UTRAN FDD cells for which the cell selection criterion S is not fulfilled.

For cdma2000 RATs, Srxlev is equal to $-\text{FLOOR}(-2 \times 10 \times \log 10 \text{ Ec/Io})$ in units of 0.5 dB, with Ec/Io referring to the value measured from the evaluated cell.

For cdma2000 RATs, ThreshX, HighP and ThreshX, LowP are equal to −1 times the values signalled for the corresponding parameters in the system information.

In all the above criteria the value of TreselectionRAT is scaled when the UE is in the medium or high mobility state. If more than one cell meets the above criteria, the UE shall reselect a cell as follows:

If the highest-priority frequency is an E-UTRAN frequency, a cell ranked as the best cell among the cells on the highest priority frequency(ies) meeting the criteria according to section 5.2.4.6;

If the highest-priority frequency is from another RAT, a cell ranked as the best cell among the cells on the highest priority frequency(ies) meeting the criteria of that RAT.

Cell reselection to another RAT, for which Squal based cell reselection parameters are broadcast in system information, shall be performed based on the Squal criteria if the UE supports Squal (RSRQ) based cell reselection to E-UTRAN from all the other RATs provided by system information which UE supports. Otherwise, cell reselection to another RAT shall be performed based on Srxlev criteria.

The cell-ranking criterion Rs for serving cell and Rn for neighbouring cells is defined by Table 1.

TABLE 1

$R_s = Q_{meas, s} + Q_{Hyst} - Qoffset_{temp}$
$R_n = Q_{meas, n} - Qoffset - Qoffset_{temp}$ where, Qmeas: RSRP measurement quantity used in cell reselections.

Qoffset: For intra-frequency: Equals to Qoffsets,n, if Qoffsets,n is valid, otherwise this equals to zero. For inter-frequency: Except for NB-IoT, equals to Qoffsets,n plus Qoffsetfrequency, if Qoffsets,n is valid, plus QoffsetSCPTM, if QoffsetSCPTM is valid, otherwise this equals to Qoffsetfrequency. For NB-IoT equals to QoffsetSCPTM, if QoffsetSCPTM is valid plus QoffsetDedicatedfrequency for any frequency other than the frequency of the dedicated frequency offset, if QoffsetDedicatedfrequency is valid, otherwise this equals to Qoffsetfrequency (if QoffsetDedicatedfrequency is valid Qoffsetfrequency is not used) plus QoffsetSCPTM, if QoffsetSCPTM is valid.

$Qoffset_{temp}$: Offset temporarily applied to a cell.

If the UE is capable of SC-PTM reception and is receiving or interested to receive an MBMS service and can only receive this MBMS service while camping on a frequency on which it is provided, the UE considers QoffsetSCPTM to be valid during the MBMS sessionas long as the two following conditions are fulfilled:

1) the UE is capable of SC-PTM reception and the reselected cell is broadcasting SIB20 (or SIB20-NB);

2) Either:

SIB15 (or SIB15-NB) of the serving cell indicates for that frequency one or more MBMS SAIs included in the MBMS User Service Description (USD) of this service; or SIB15 (or SIB15-NB) is not broadcast in the serving cell and that frequency is included in the USD of this service.

The UE shall perform ranking of all cells that fulfil the cell selection criterion S for NB-IoT), but may exclude all CSG cells that are known by the UE not to be CSG member cells.

The cells shall be ranked according to the R criteria specified above, deriving Qmeas,n and Qmeas,s and calculating the R values using averaged RSRP results.

If a cell is ranked as the best cell the UE shall perform cell reselection to that cell. If this cell is found to be not-suitable, the UE shall not consider this cell and other cells on the same frequency, as candidates for reselection for a maximum of 300s. If the UE enters into state any cell selection, any limitation shall be removed. If the UE is redirected under E-UTRAN control to a frequency for which the timer is running, any limitation on that frequency shall be removed.

In all cases, the UE shall reselect the new cell, only if the following conditions are met:

the new cell is better ranked than the serving cell during a time interval TreselectionRAT;

more than 1 second has elapsed since the UE camped on the current serving cell.

In NB-IOT or LTE eMTC, UE performing Early Data Transmission may transmit uplink data or receive downlink data while in RRC_IDLE where UE may perform cell reselection. In NR, UE may transmit uplink data or receive downlink data while in RRC_INACTIVE where UE may perform cell reselection.

If UE performs data transmission in RRC_IDLE or RRC_INACTIVE while performing cell reselection, UE may re-transmit data whenever UE changes to another cell according to the cell reselection process. Thus, cell reselection may cause interruption in data transmission by preventing UE from performing data transmission and reception.

Figure 5:
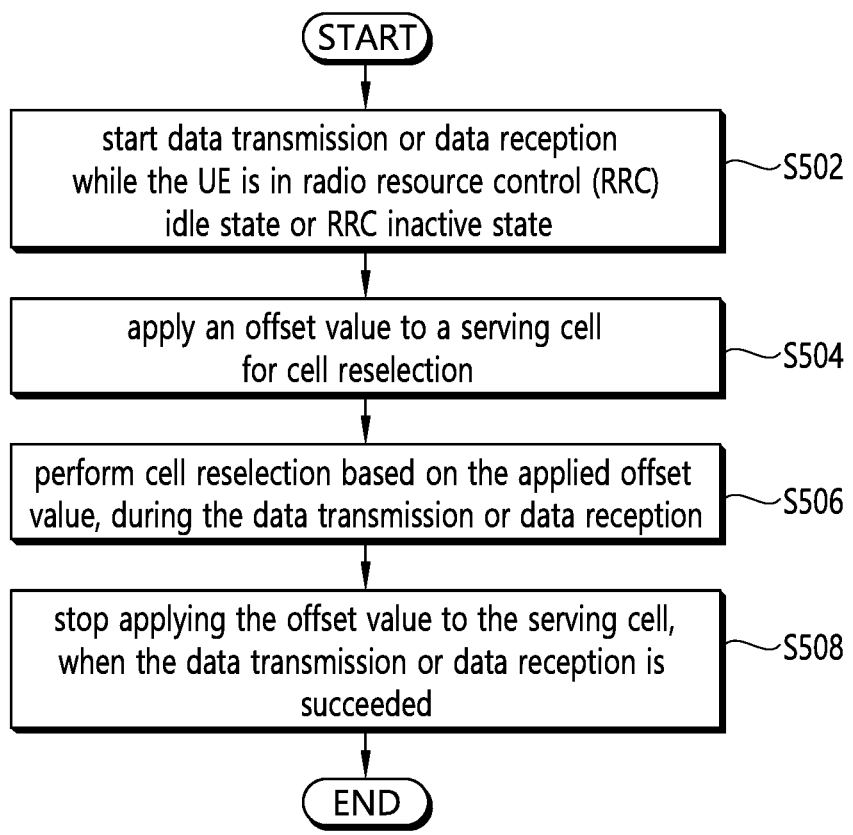
FIG. 5 shows a method for performing cell reselection according to an embodiment of the present invention.

FIG. 5 shows a method for performing cell reselection according to an embodiment of the present invention.

In step S502, the UE may start data transmission or data reception while the UE is in radio resource control (RRC) idle state or RRC inactive state.

In step S504, the UE may apply an offset value to a serving cell for cell reselection. In prior, the UE may receive information on the offset value from the network. The information on the offset value may be received via at least one of system information, RRC message or paging message. The offset value may be positive value. The UE may apply negative value of offset to at least one of neighbor cell, before performing the cell reselection. Further, the UE may consider a frequency of the serving cell as highest priority frequency, before performing the cell reselection.

In step S506, the UE may perform cell reselection based on the applied offset value, during the data transmission or data reception. The UE may transmit an indication, which indicates that serving cell is changed while data transmission or data reception, to a new serving cell when the UE reselects the new serving cell by the cell reselection. The indication may be transmitted during ran-based notification area (RNA) update procedure. The indication may be transmitted via a dedicated random access channel (RACH) preamble. The indication may be transmitted via a media access control (MAC) control element (CE).

In step S508, the UE may stop applying the offset value to the serving cell, when the data transmission or data reception is succeeded.

According to embodiments of the present invention, performing cell reselection to neighbor cell while a UE camping on a serving cell is transmitting or receiving data may be avoided, by applying offset on cells or by adjusting priorities. Even when cell reselection to another cell is performed, the UE may continue data transmission/reception for a new cell by promptly notifying the cell change.

According to an embodiment of the present invention, cell reselection during data transmission in RRC_IDLE or RRC_INACTIVE may be deprioritized. That is, when a UE is camping a cell and performing data transmission/reception at the cell, the UE may de-prioritize reselecting another cell. In this embodiment, three options for de-prioritizing cell reselection may be considered.

Option 1: The UE may apply an offset to a serving cell or a neighboring cell in the cell-ranking criterion during data transmission/reception in RRC_IDLE or RRC_INACTIVE. In this option, a plus value of offset may be applied to the serving cell, and a minus value of offset may be applied for the neighboring cell. Then, when a cell is ranked as the best cell, the UE may perform cell reselection to that cell. In this manner, the UE may stay in the original cell.

In an embodiment of the present invention, when UE in RRC_IDLE or RRC INACTIVE initiates uplink transmission (e.g. random access preamble transmission) for sending data to the network or receiving data from the network, or when UE in RRC_IDLE or RRC INACTIVE receives paging for receiving data from the network, UE may calculate cell-ranking criterion for a cell by temporarily applying an offset to the cell. The cell may be one of the serving cell and neighboring cells. Then, when the UE completes data transmission or data reception, UE may calculate cell-ranking criterion for a cell by not applying the offset to the cell. The offset may be received from a cell.

Option 2: The UE may consider the current frequency of the cell to be the highest priority frequency during data transmission/reception in RRC_IDLE or RRC_INACTIVE. Alternatively, the UE may consider frequencies other than the current frequency of the cell to be the lowest priority frequency during data transmission/reception in RRC_IDLE or RRC_INACTIVE.

In an embodiment of the present invention, when UE in RRC_IDLE or RRC INACTIVE camping on a cell initiates uplink transmission (e.g. random access preamble transmission) for sending data to the network or receiving data from the network, or when UE in RRC_IDLE or RRC INACTIVE receives paging for receiving data from the network, the UE may consider the current frequency of the cell to be the highest priority frequency (i.e. higher than any of the network configured values), irrespective of any other priority value allocated to this frequency. Then, when the UE camping on a cell completes data transmission or data reception, the UE may set the current frequency to the priority value that the network allocated to this frequency.

Option 3: The UE may apply a first value to Treselection (or Treselection_none) during no data transmission/reception in RRC_IDLE or RRC_INACTIVE, while applying a second value to Treselection (or Treselection_data) during data transmission/reception in RRC_IDLE or RRC_INACTIVE. Then, the UE shall reselect the new cell, if the new cell is better ranked than the serving cell during a time interval Treselection. The first value is configured by the network and desirably shorter than the second value. The UE may scale up or down the first value to calculate the second value.

When UE stops data transmission/reception, the UE may stop applying the above option. Namely, after UE stops data transmission/reception, the UE may stop de-prioritizing cell reselection to another cell.

The initiation of uplink transmission may include one of RRC Connection Request message transmission, RRC Connection Resume message transmission, RRC Early Data Request message transmission, Random Access preamble transmission, and RACH MSG3 transmission.

If UE transmits end of transmission to the network or completes the last (re-) transmission of the last MAC PDU, UE may consider completion of the data transmission. If UE receives end of transmission from the network or completes reception of the last MAC PDU, UE may consider completion of the data reception.

For Option 1, while UE in RRC_IDLE or RRC INACTIVE performs uplink transmission (e.g. random access preamble transmission) for sending data to the network or receiving data from the network, UE may perform cell reselection by applying offset to the serving cell or the neighbor cell. The cell-ranking criterion Rs for serving cell and Rn for neighboring cells may be defined by Table 2.

TABLE 2

$R_s = Q_{meas,\,s} + Q_{Hyst} - \text{Qoffset}_{temp}$
$R_n = Q_{meas,\,n} - \text{Qoffset} - \text{Qoffset}_{temp}$ where, Qmeas: RSRP measurement quantity used in cell reselections.

Qoffset: For intra-frequency: Equals to Qoffsets,n, if Qoffsets,n is valid, otherwise this equals to zero.

For inter-frequency: Except for NB-IoT, equals to Qoffsets,n plus Qoffsetfrequency, if Qoffsets,n is valid, plus QoffsetSCPTM, if QoffsetSCPTM is valid, otherwise this equals to Qoffsetfrequency.

For NB-IoT equals to QoffsetSCPTM, if QoffsetSCPTM is valid plus QoffsetDedicatedfrequency for any frequency other than the frequency of the dedicated frequency offset, if QoffsetDedicatedfrequency is valid, otherwise this equals to Qoffsetfrequency (if QoffsetDedicatedfrequency is valid Qoffsetfrequency is not used) plus QoffsetSCPTM, if QoffsetSCPTM is valid plus Qoffset_data if Qoffset data is valid.

Qoffset$_{temp}$: Offset temporarily applied to a cell.

If UE in RRC_IDLE or RRC INACTIVE camping on a cell initiates uplink transmission (e.g. random access preamble transmission) for sending data to the network or receiving data from the network, or if UE in RRC_IDLE or RRC INACTIVE receives paging for receiving data from the network, UE may consider Qoffset data to be valid.

Meanwhile, Qoffset_data may be positive value for serving cell, and may be negative value for neighbor cells.

The cells shall be ranked according to the R criteria specified above, deriving Qmeas,n and Qmeas,s and calculating the R values using averaged RSRP results.

If a cell is ranked as the best cell the UE shall perform cell reselection to that cell. If this cell is found to be not-suitable, the UE shall not consider this cell and other cells on the same frequency, as candidates for reselection for a maximum of 300s. If the UE enters into state any cell selection, any limitation shall be removed. If the UE is redirected under E-UTRAN control to a frequency for which the timer is running, any limitation on that frequency shall be removed.

In all cases, the UE shall reselect the new cell, only if the following conditions are met:
 the new cell is better ranked than the serving cell during a time interval Treselection;
 more than 1 second has elapsed since the UE camped on the current serving cell.

For Option 3, The UE may apply the first value to Treselection (or Treselection_none) during no data transmission/reception in RRC_IDLE or RRC_INACTIVE, while applying the second value to Treselection (or Treselection_data) during data transmission/reception in RRC_IDLE or RRC_INACTIVE. Then, the UE shall reselect the new cell, if the new cell is better ranked than the serving cell during a time interval Treselection. The first value may be configured by the network and to be shorter than the second value. The UE may scale up or down the first value to calculate the second value.

The Qoffset_data or the Treselection_data may be transmitted through at least one of System information (e.g., SystemInformationBlockType2), RRC message indicating the state transition to RRC_INACTIVE, or RRC_IDLE, or suspend state (e.g., RRCConnectionRelease) or Paging message (e.g., RAN paging or CN paging).

The UE may start or restart de-prioritization of cell reselection to another cell at the time point when at least one of the following conditions is met:

UL data is generated in RRC_INACTIVE or RRC_IDLE and the UE decides to transmit the data without RRC state transition. If the UL data is transmitted during RA procedure, the time point may be defined to the time value of the TTI when the (initial) preamble is transmitted or when the data with MSG3 is transmitted. If the UL data is transmitted on the contention based UL resource or the dedicated UL resource, the time point may be defined to the time value of the TTI when the initial data is transmitted.

PDCCH used for paging or Paging message for DL data is received and the paging indicates DL data reception without RRC state transition. The time point may be defined to the time valued of the TTI when the paging message is received.

A message informing the UE location (RAN/NB level) as an ACK for paging is transmitted. If the UE informs its location through the RA procedure, the time point may be defined to the time value of the TTI when the (initial) preamble is transmitted or when the MSG3 is transmitted. If CFRA is triggered, it may start the timer when the dedicated preamble is transmitted. If CBRA is triggered, it may start the timer when the MSG3 with UEID is transmitted. If the UE informs its location through the contention based UL resource, the time point may be defined to the time value of the TTI when the control message with UEID is transmitted.

The UE may stop de-prioritization of cell reselection to another cell at the time point when at least one of the following conditions is met:

ACK message for UL data is received.

ACK message for UL data with end marker is received. If the UL data is transmitted with RRC message, the time point may be defined to the time value of the TTI when the RRC response message is received. Or, if the UL data is transmitted during RA procedure, the time point may be defined to the time value of the TTI when the ACK message with MSG4 is received, when the MSG4 with UEID is received, when the MAC timer for contention resolution expires, or when the number of preamble transmission (PREAMBLE_TRANSMISSION_COUNTER) reaches the maximum value.

ACK message for DL data is successfully transmitted.

ACK message for DL data with end marker is successfully transmitted. If the UL data is received with RRC message, the time point may be defined to the time value of the TTI when the RRC response message is successfully transmitted. Or, if the DL data is received in the paging message and RA procedure is performed as the acknowledgement, the time point may be defined to the time valued of the TTI when the RA procedure is successfully performed. Or, if the DL data is received during RA procedure, the time point may be defined to the time value of the TTI when the ACK for MSG2 (RAR) is successfully transmitted, or when the ACK for MSG4 (contention resolution) is successfully transmitted.

DL data is successfully received.

DL data with end marker is successfully received.

In an embodiment of the present invention, the ACK message may be an acknowledgement in at least one of HARQ, MAC, RRC, or application layer.

Figure 6:
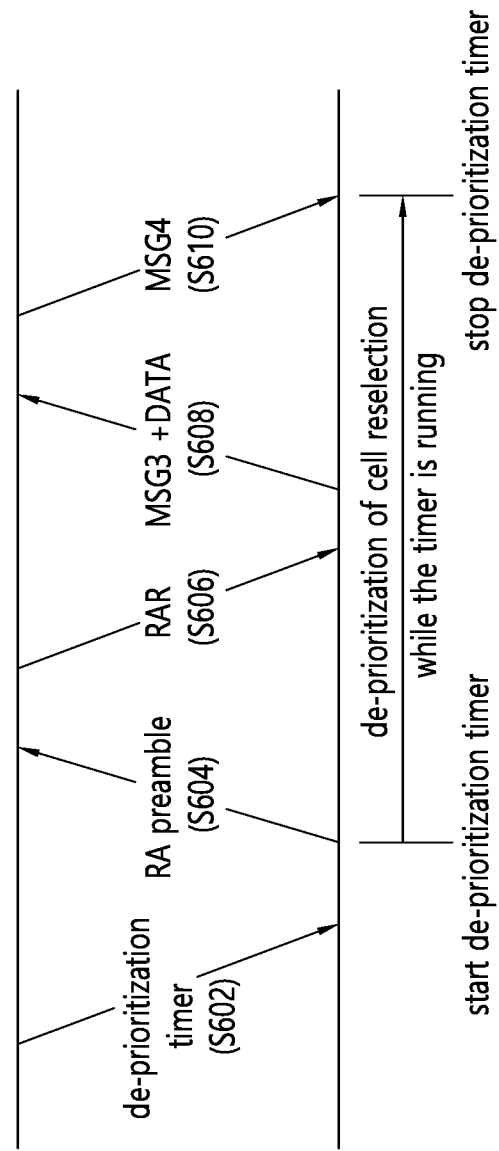
FIG. 6 shows an example for de-prioritization of cell reselection for mobile originating data according to an embodiment of the present invention.

FIG. 6 shows an example for de-prioritization of cell reselection for mobile originating data according to an embodiment of the present invention.

In this embodiment, it may be assumed that the UE in RRC_INACTIVE or RRC_IDLE transmits UL data with MSG3 during RA procedure. In RRC_IDLE, UE may be bandwidth limited and low cost UE (e.g. NB-IOT UE, BL UE) or UE in Enhanced Coverage (e.g. CE mode 1 or 2). The UE may perform Early Data Transmission. UE may be registered in MME of EPC. In RRC_INACTIVE, UE may be NR UE or eLTE UE. UE may be registered in AMF of 5G Core.

In step S602, UE camping on a cell may receive information on de-prioritization timer from a gNB or eNB. The information on de-prioritization timer may include a value for Qoffset_data or the Treselection_data. The value for Qoffset_data or the Treselection_data may be received via SIB or RRC messages.

In step S604, if a data is generated in RRC_INACTIVE or RRC_IDLE and the UE decides to transmit the data without RRC state transition (to RRC_CONNECTED), UE may start a de-prioritization timer. While the de-prioritization timer is running, the UE may de-prioritize cell selection to another cell by applying one of the above options possibly with the received Qoffset_data or the Treselection_data, when the initial RA preamble or MSG3 is transmitted. The UE may prioritize the camped cell or the current frequency of the camped cell. Further, in this step, the UE may transmit random access (RA) preamble.

In step S606, the UE may receive RA response for the RA preamble.

In step S608, the UE may transmit data with MSG 3.

In step S610, the UE may receive the MSG4 with its UEID from the network. When the UE successfully receives MSG 4, the UE may stop the de-prioritization timer. If the UE does not receive MSG 4, the UE transmit RA preamble to the network until the UE successfully receives MSG 4 (back to step S604). When the de-prioritization timer expires, the UE may perform the cell reselection.

Figure 7:
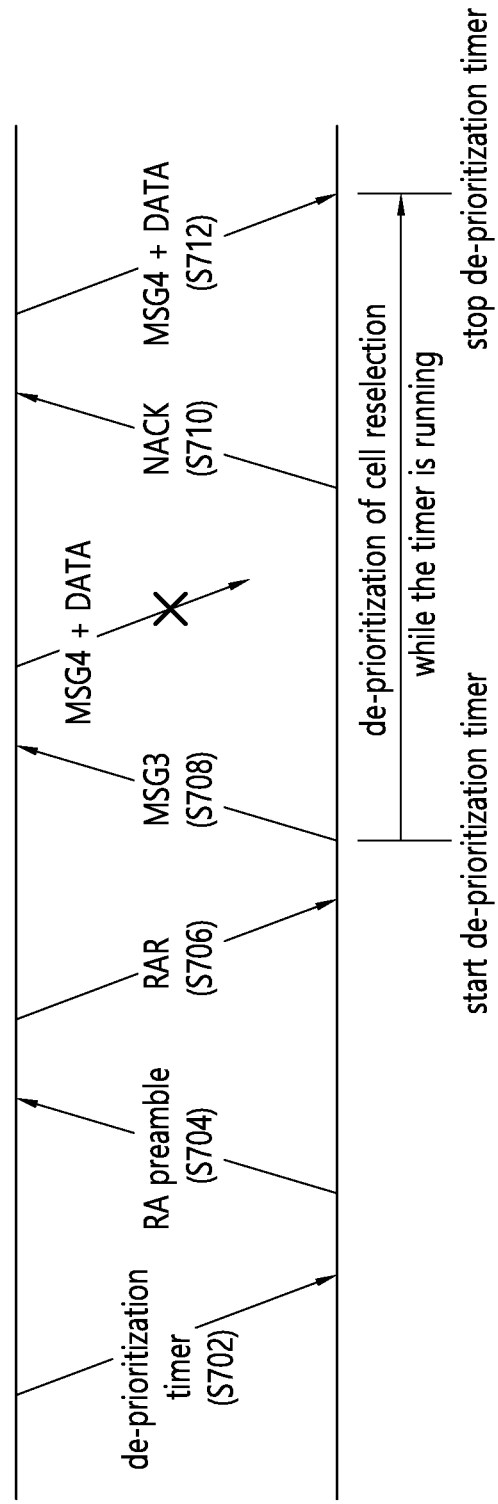
FIG. 7 shows an example for de-prioritization of cell reselection for mobile terminating data according to an embodiment of the present invention.

FIG. 7 shows an example for de-prioritization of cell reselection for mobile terminating data according to an embodiment of the present invention.

In this embodiment, it may be assumed that the UE in RRC_INACTIVE or RRC_IDLE receives DL data with MSG2 or MSG4 during RA procedure. In RRC_IDLE, UE may be bandwidth limited and low cost UE (e.g. NB-IOT UE, BL UE) or UE in Enhanced Coverage (e.g. CE mode 1 or 2). UE performs Early Data Transmission. UE may be registered in MME of EPC. In RRC_INACTIVE, UE may be NR UE or eLTE UE. UE may be registered in AMF of 5G Core.

In step S702, UE camping on a cell may receive information on de-prioritization timer from a gNB or eNB. The information on de-prioritization timer may include a value for Qoffset_data or the Treselection_data. The value for Qoffset_data or the Treselection_data may be received via paging message.

In step S704, the UE may transmit RA preamble in response to the paging message.

In step S706, the UE may receive RA response (RAR) from the network.

In step S708, the UE may transmit MSG3 to the network. The MSG3 may be one of RRC Connection Request message transmission, RRC Connection Resume message transmission, RRC Early Data Request message transmission, Random Access preamble transmission, and RACH MSG3 transmission.

If the network indicates DL data reception without RRC state transition, the UE may start a de-prioritization timer. In case of contention based random access procedure, the UE may start a de-prioritization timer, when the UE transmits MSG 3 in response to RAR. In case of non-contention based random access procedure, the UE may start a de-prioritization timer, when the UE transmits dedicated preamble directly after receiving paging message. Thus, in case of non-contention based random access procedure, step S704 and S706 may be skipped, and the MSG 3 may be replaced with dedicated preamble.

While the de-prioritization timer is running, the UE may de-prioritize cell selection to another cell by applying one of the above options possibly with the received Qoffset_data or the Treselection_data, when the RA preamble (e.g. dedicated preamble) is transmitted or the MSG3 with UEID is transmitted. The UE may prioritize the camped cell or the current frequency of the camped cell.

In step S710, if the data with its UEID is not successfully received from the network, the UE may transmit NACK message to the network.

In step S712, if the data with its UEID is successfully received from the network, the UE may stop the de-prioritization timer. If the de-prioritization timer expires, the UE may perform the cell reselection.

Even when the UE tries to stay in current serving cell, cell reselection would be performed in low probability for some reasons. Hereinafter, procedures performed by the UE after cell reselection to another cell is described.

In this embodiment, while the UE is camping a cell and performing data transmission/reception in RRC_IDLE or RRC_INACTIVE at the cell, the UE may reselect another cell due to cell reselection rule. That is, the UE may move to another cell during performing data transmission/reception in RRC_IDLE or RRC_INACTIVE state. In this situation, the UE fails to complete transmission/reception of data due to the cell reselection. According to an embodiment of the present invention, cell change indication during data transmission in RRC_IDLE or RRC_INACTIVE state is provided.

When the UE reselect another cell, the UE may indicate that UE has data to be transmitted or received to the reselected cell. Further, the UE may indicate cell change to gNB or eNB at the reselected cell.

For an example, the UE may trigger RAN Area Update procedure at the reselected cell. The uplink message of this procedure, e.g. RRC Connection Resume Request message, may indicate one or more of the followings:
  MT access, if UE previously performed data reception triggered by paging
  MO data, if UE previously performed data transmission
  Access Category corresponding to the data
  Failure of data transmission or reception
  Cell ID corresponding to the previously camped cell where UE performed data transmission or reception
  The Sequence Number of the last Layer 2 PDU or SDU that UE successfully transmitted or received from the previously camped cell, e.g. The Sequence Number of the last Layer 2 PDU or SDU positively acknowledged For another example, the UE may trigger RACH procedure and send a RACH preamble to gNB or eNB. If configured by gNB or eNB, the RACH preamble may be dedicated to this purpose. That is, the RACH preamble is specific to indicate the cell change.

Figure 8:
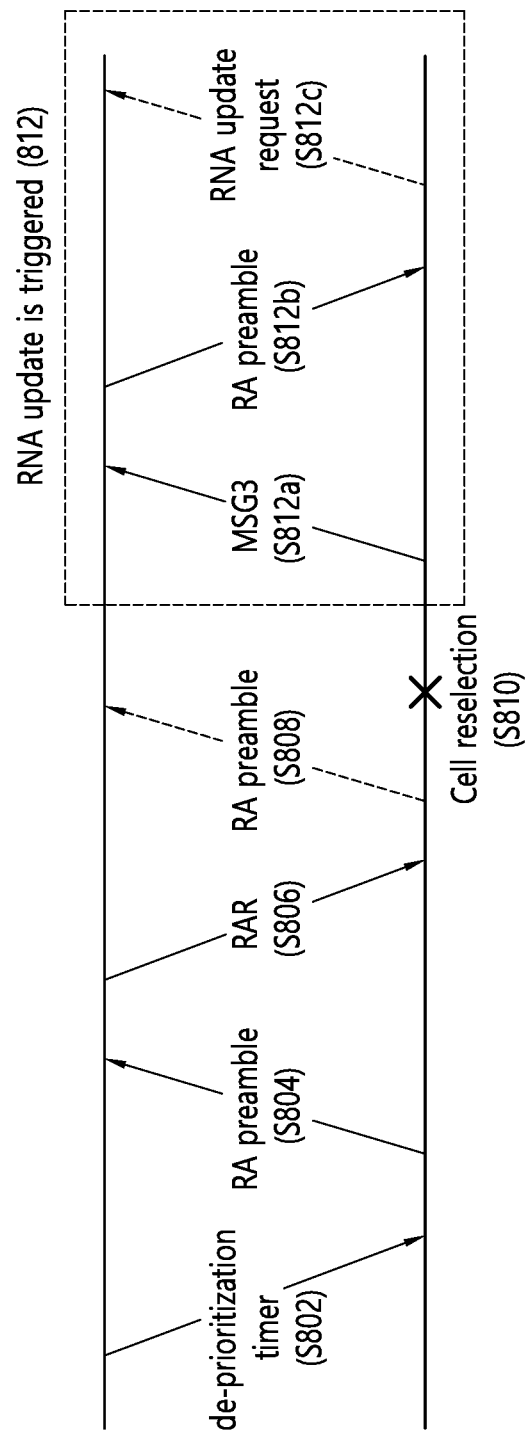
FIG. 8 shows a method for RAN update during data transmission in RRC_IDLE or RRC_INACTIVE state.

For another example, the UE may trigger transmission of a MAC Control Element and send the MAC Control Element to gNB or eNB at the reselected cell. The MAC Control Element corresponds to at least one of the followings:
  Buffer Status Reporting MAC CE
  C-RNTI MAC CE
  Timing Advance Command MAC CE
  Configured Grant Confirmation MAC CE
  Power Headroom Report MAC Control Element
  Data Volume and Power Headroom Report MAC Control Element
  SPS confirmation MAC Control Element
  Recommended bit rate MAC Control Element FIG. 8 shows a method for RAN update during data transmission in RRC_IDLE or RRC_INACTIVE state.

In step S802, UE camping on a cell may receive information on de-prioritization timer from a gNB or eNB. The information on de-prioritization timer may include a value for Qoffset_data or the Treselection_data. The value for Qoffset_data or the Treselection_data may be received via paging message.

In step S804, the UE may transmit RA preamble in response to the paging message.

In step S806, the UE may receive RA response (RAR) from the network.

In step S808, the UE may transmit MSG3 to the network. The MSG3 may be one of RRC Connection Request message transmission, RRC Connection Resume message transmission, RRC Early Data Request message transmission, Random Access preamble transmission, and RACH MSG3 transmission.

In step S810, the cell reselection may be performed. Thus, the UE fails to complete data transmission/reception.

In step S812, the UE may trigger RAN Area Update procedure at the reselected cell. Specifically, the UE may transmit RA preamble to network via the reselected cell (S812*a*). The UE may receive RAR in response to the RA preamble (S812*b*). The UE may transmit RNA update request message to the network via the reselected cell (S812*c*).

Figure 9:
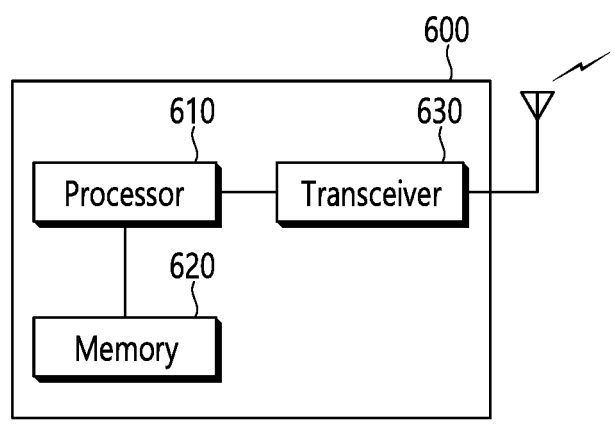
FIG. 9 shows a UE to implement an embodiment of the present invention.

FIG. 9 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to start data transmission or data reception while the UE is in radio resource control (RRC) idle state or RRC inactive state.

The processor 610 is configured to apply an offset value to a serving cell for cell reselection. In prior, the processor 610 may receive information on the offset value from the network. The information on the offset value may be received via at least one of system information, RRC message or paging message. The offset value may be positive value. The UE may apply negative value of offset to at least one of neighbor cell, before performing the cell reselection. Further, the UE may consider a frequency of the serving cell as highest priority frequency, before performing the cell reselection.

The processor 610 is configured to perform cell reselection based on the applied offset value, during the data transmission or data reception. The processor 610 may transmit an indication, which indicates that serving cell is changed while data transmission or data reception, to a new serving cell when the UE reselects the new serving cell by the cell reselection. The indication may be transmitted during ran-based notification area (RNA) update procedure. The indication may be transmitted via a dedicated random access channel (RACH) preamble. The indication may be transmitted via a media access control (MAC) control element (CE).

The processor 610 is configured to stop applying the offset value to the serving cell, when the data transmission or data reception is succeeded.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiment of the present invention shown in FIG. 9, performing cell reselection to neighbor cell while a UE camping on a serving cell is transmitting or receiving data may be avoided, by applying offset on cells or by adjusting priorities. Even when cell reselection to another cell is performed, the UE may continue data transmission/reception for a new cell by promptly notifying the cell change.

Figure 10:
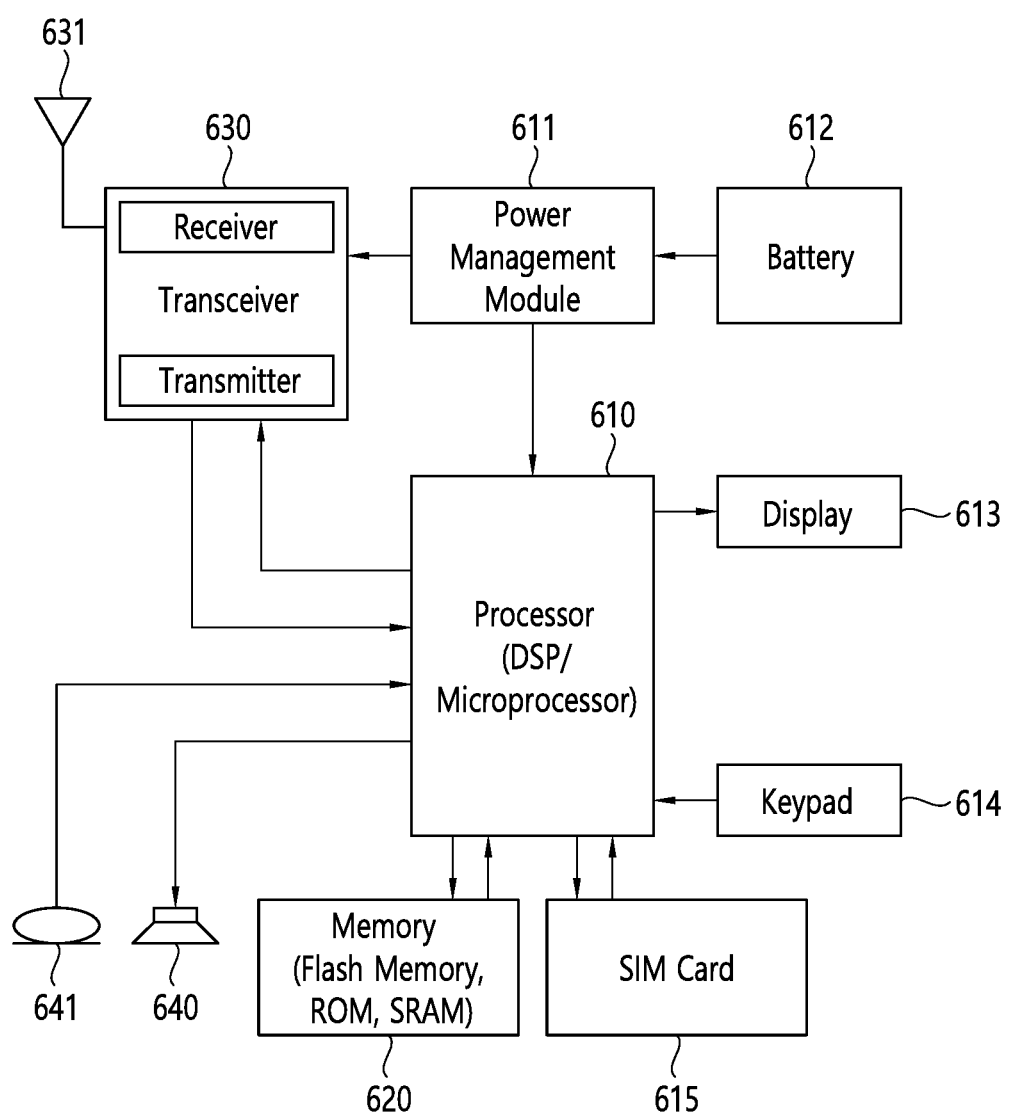
FIG. 10 shows more detailed UE to implement an embodiment of the present invention.

FIG. 10 shows more detailed UE to implement an embodiment of the present invention. The present invention described above for UE side may be applied to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to start data transmission or data reception while the UE is in radio resource control (RRC) idle state or RRC inactive state.

The processor 610 is configured to apply an offset value to a serving cell for cell reselection. In prior, the processor 610 may receive information on the offset value from the network. The information on the offset value may be received via at least one of system information, RRC message or paging message. The offset value may be positive value. The UE may apply negative value of offset to at least one of neighbor cell, before performing the cell reselection. Further, the UE may consider a frequency of the serving cell as highest priority frequency, before performing the cell reselection.

The processor 610 is configured to perform cell reselection based on the applied offset value, during the data transmission or data reception. The processor 610 may transmit an indication, which indicates that serving cell is changed while data transmission or data reception, to a new serving cell when the UE reselects the new serving cell by the cell reselection. The indication may be transmitted during ran-based notification area (RNA) update procedure. The indication may be transmitted via a dedicated random access channel (RACH) preamble. The indication may be transmitted via a media access control (MAC) control element (CE).

The processor 610 is configured to stop applying the offset value to the serving cell, when the data transmission or data reception is succeeded.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 10, performing cell reselection to neighbor cell while a UE camping on a serving cell is transmitting or receiving data may be avoided, by applying offset on cells or by adjusting priorities. Even when cell reselection to another cell is performed, the UE may continue data transmission/reception for a new cell by promptly notifying the cell change.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
    starting data transmission or data reception while the UE is in a radio resource control (RRC) idle state or RRC inactive state;
    applying an offset value to a serving cell for cell reselection;
    performing cell reselection based on the applied offset value, during the data transmission or data reception;
    stopping the application of the offset value to the serving cell based on the data transmission or data reception being successful; and
    transmitting an indication of a serving cell change, during data transmission or data reception, to a new serving cell when the UE reselects the new serving cell by the cell reselection.

2. The method of claim 1, further comprising:
    receiving information on the offset value from a network.

3. The method of claim 1, wherein the information on the offset value is received via at least one of system information, a RRC message or a paging message.

4. The method of claim 1, wherein the offset value is a positive value.

5. The method of claim 4, further comprising:
    applying a negative offset value to at least one neighbor cell, before performing the cell reselection.

6. The method of claim 1, further comprising:
    considering a frequency of the serving cell as a highest priority frequency, before performing the cell reselection.

7. The method of claim 1, wherein the indication is transmitted during a ran-based notification area (RNA) update procedure.

8. The method of claim 1, wherein the indication is transmitted via a dedicated random access channel (RACH) preamble.

9. The method of claim 1, wherein the indication is transmitted via a media access control (MAC) control element (CE).

10. A user equipment (UE) in a wireless communication system, the UE comprising:
    a transceiver for transmitting or receiving a radio signal; and
    a processor operatively coupled to the transceiver,
    the processor configured to:
    start data transmission or data reception while the UE is in a radio resource control (RRC) idle state or a RRC inactive state;
    apply an offset value to a serving cell for cell reselection;
    perform cell reselection based on the applied offset value, during the data transmission or data reception;
    stop the application of the offset value to the serving cell based on the data transmission or data reception being successful; and
    control the transceiver to transmit an indication of a serving cell change, during data transmission or data reception, to a new serving cell when the UE reselects the new serving cell by the cell reselection.

11. The UE of claim 10, wherein the processor is further configured to:
    control the transceiver to receive information on the offset value from a network.

12. The UE of claim 10, wherein the information on the offset value is received via at least one of system information, a RRC message or a paging message.

13. The UE of claim 1, wherein the offset value is a positive value.

14. A processor for a wireless communication device in a wireless communication system,
    wherein the processor is configured to control the wireless communication device to:
    start data transmission or data reception while the UE is in a radio resource control (RRC) idle state or a RRC inactive state;
    apply an offset value to a serving cell for cell reselection;
    perform cell reselection based on the applied offset value, during the data transmission or data reception;
    stop the application of the offset value to the serving cell based on the data transmission or data reception being successful; and
    transmit an indication of a serving cell change, during data transmission or data reception, to a new serving cell when the UE reselects the new serving cell by the cell reselection.

15. The method of claim 1, wherein the UE is in communication with at least one of a mobile device, a network, and/or autonomous vehicles other than the UE.

* * * * *